United States Patent [19]
Chui et al.

[11] Patent Number: 5,959,200
[45] Date of Patent: Sep. 28, 1999

[54] MICROMACHINED CANTILEVER STRUCTURE PROVIDING FOR INDEPENDENT MULTIDIMENSIONAL FORCE SENSING USING HIGH ASPECT RATIO BEAMS

[75] Inventors: Benjamin W. Chui, Sunnyvale; Thomas W. Kenny, San Carlos, both of Calif.

[73] Assignee: The Board of Trustees of the Leland Stanford Junior University, Stanford, Calif.

[21] Appl. No.: 08/924,427

[22] Filed: Aug. 27, 1997

[51] Int. Cl.[6] ........................................ G01B 7/34
[52] U.S. Cl. .................................... 73/105; 73/812
[58] Field of Search ........................ 73/105, 777, 812, 73/849, 514.34, 514.36, 514.38

[56] References Cited

U.S. PATENT DOCUMENTS

| | | | |
|---|---|---|---|
| 3,277,698 | 10/1966 | Mason | 73/777 |
| 3,378,648 | 4/1968 | Fenner | 73/777 |
| 3,417,322 | 12/1968 | Fenner | 73/777 |
| 4,981,552 | 1/1991 | Mikkor | 156/647 |
| 5,083,466 | 1/1992 | Hino et al. | 395/115 |
| 5,095,762 | 3/1992 | Holm-Kennedy et al. | 73/862.04 |
| 5,151,763 | 9/1992 | Marek et al. | 73/514.36 |
| 5,321,977 | 6/1994 | Clabes et al. | 73/105 |
| 5,345,815 | 9/1994 | Albrecht et al. | 73/105 |
| 5,345,816 | 9/1994 | Clabes et al. | 73/105 |
| 5,386,270 | 1/1995 | Housel | 355/202 |
| 5,425,750 | 6/1995 | Mpberg | 73/514.34 |
| 5,442,444 | 8/1995 | Landwehr | 356/376 |
| 5,463,897 | 11/1995 | Prater et al. | 73/105 |
| 5,483,822 | 1/1996 | Albrecht et al. | 73/105 |
| 5,537,372 | 7/1996 | Albrecht et al. | 369/43 |
| 5,583,286 | 12/1996 | Matsuyama | 73/105 |
| 5,595,942 | 1/1997 | Albrecht et al. | 437/228 |
| 5,625,142 | 4/1997 | Gamble | 73/105 |

*Primary Examiner*—Max H. Noori
*Attorney, Agent, or Firm*—Lumen Intellectual Property Services

[57] ABSTRACT

A micromachined structure providing for independent vertical and lateral deflection sensing. The structure uses high aspect ratio ribs which bend much more easily in one direction than in other directions (i.e., have a predominant direction of compliance). One or more ribs are combined to form beams which also have one predominant direction of compliance. Two such beams are bonded end to end, and one end of the beam pair is bonded to a base. The beams are oriented orthogonally to one another such that they independently bend to vertical and lateral external forces. Further, three dimensional force sensing can be accomplished by adding a third beam. Sensors can independently sense the bending in each beam and thereby independently measure the dimensional components of bending forces applied to the free end of the structure. In the preferred embodiment, piezoresistive sensors are formed on the ribs comprising the beams. The piezoresistors can be made by ion-implantation, for example. Measurement of the change in resistance of the sensors is then a measure of the beam deflection and the external force. The resistances of the sensors can be measured independently. Other sensing means include voltage measurement of piezoelectric effects, optical deflection and interference sensing techniques, and capacitive deflection sensors.

35 Claims, 7 Drawing Sheets

MICROMACHINED CANTILEVER STRUCTURE PROVIDING FOR INDEPENDENT MULTIDIMENSIONAL FORCE SENSING USING HIGH ASPECT RATIO BEAMS

FIELD OF THE INVENTION

This invention relates generally to micromachined cantilevers for sensing deflections, more particularly, it relates to micromachined cantilever structures using piezoresistors for sensing deflections due to external forces.

BACKGROUND OF THE INVENTION

Micromachined cantilevers are commonly used in such applications as atomic force microscopy (AFM), scanning probe microscopy (SPM), data storage and accelerometers. Conventional micromachined cantilevers consist of flat, horizontal beams that flex or deflect in response to forces applied at the tip. Thus, the tip can be scanned across a surface and the cantilever deflections measured in order to generate information about the topology of the surface.

The prior art teaches about cantilever structures for sensing forces acting directly on the tip of a cantilever. For example, Clabes et al. in U.S. Pat. No. 5,321,977 discuss how to mount a piezoelectric jacket consisting of four sensors on a tip stem. These sensors extend along the edges of the tip stem and respond to the bending of the stem during a scanning cycle. Since the amount by which each of the sensors is bent varies, the three dimensional position of the tip can be derived from the signals generated by the sensors. Clabes uses only a single stem for mounting all the piezoelectric sensors and does not use a multibeam structure.

Another method of detecting cantilever deflections is by piezoresistive sensing. In this approach, the cantilever is made of or incorporates a piezoresistive material. A piezoresistive material is a type of material whose electrical resistance changes with internal mechanical stress. Compression and tension will result in opposite polarities of change in electrical resistance. When a piezoresistive cantilever flexes, the stress in it changes, causing changes in its electrical resistance. By measuring this variation in electrical resistance, the deflection of the cantilever can be derived.

In U.S. Pat. No. 5,083,466 Holm-Kennedy et al. disclose a multibeam structure for measuring displacement of one or more response elements to detect multi-dimensional components of an applied force. The structures taught by the inventors include response elements mounted on flexible beams made of silicon. The bending of the beams are usually sensed by piezoelectric and capacitive methods. In one of the embodiments disclosed by Holm-Kennedy et al. ('466), the intrinsic piezoresistive quality of the beam material (silicon) is used for sensing the elongation and contraction of the beam. The geometry of the arrangement taught does not allow one to sense bending of the beam because for a piezoresistor to change resistance, it must experience net compressive or tensile stress. Since the piezoresistor described by Holm-Kennedy occupies the entire volume of the beam, any pure bending deformation will result in the mutual cancellation of compressive and tensile piezoresistive responses. A similar effect occurs if the piezoresistor is isolated to the central region of the beam. The piezoresistor must be asymmetrically located on or within the beam to detect bending.

Other types of micromachined devices do exist that allow the use of cantilever beams to detect bending motion with piezoresistors. One such device is disclosed by Albrecht et. al. in U.S. Pat. No. 5,345,815. In this approach, the piezoresistor is located close to one surface of the beam, so that when the beam bends, the piezoresistor senses a net compressive or tensile stress. Albrecht has only one axis of compliance, so it is limited to sensing bending in one direction-vertical. U.S. Pat. No. 5,444,244 to Kirk et al. describes a piezoresistive cantilever which can sense both vertical and lateral bending by means of vertical and torsional bending modes of the cantilever. In accordance with this solution two planar piezoresistive elements are mounted on a flat cantilever made up of two flat beams. Preferably, the flexibility of the beams is ameliorated and restricted to predetermined locations on the cantilever by corrugations or notches serving as flex points. The piezoresistors are placed on the beams preferably close to or at those flex points to maximize the piezoresistive effect. Lateral and vertical deflections of the tip translate into torsion and bending of the piezoresistive elements. The piezoresistive elements are arranged such that their fractional resistance changes are different depending on whether the deflection of the cantilever is lateral or vertical. The properties of such cantilever systems are described by J. Brugger et al. in "Lateral Force Measurements in a Scanning Force Microscope with Piezoresistive Sensors" presented at Transducers '95, 8th International Conference on Solid-State Sensors and Actuators and Eurosensors IX, Stockholm, Sweden, Jun. 25–29, 1995, pp. 636. This invention requires the use of signal processing circuitry to separate the vertical and lateral components of the applied force. The vertical deflection information is derived from the sum of the resistance change in the piezoresistive elements and the lateral deflection is similarly derived from the difference.

A structure similar to that taught by Kirk et al. is also found in U.S. Pat. No. 5,386,720 to Toda et al. The inventors discuss an integrated SPM sensor including a cantilever with two beams. The general construction of this cantilever is designed such that a displacement of the right portion of the cantilever or the left portion of the cantilever are measured relative to a central longitudinal axis. The torsion of the cantilever is detected on the basis of the detection signals from the detection means measuring the differential resistance change in the two cantilever beams.

The cantilevers produced according to these techniques are limited to flat structures. In addition, since the same mechanical element is used in two detection modes, the vertical stiffness of the cantilever has to be balanced against its torsional stiffness during the design process, leading to potential compromises in versatility and performance. Also, the mixing of signals associated with vertical and lateral forces in these devices can lead to the difficult problems of signal separation and data interpretation.

OBJECTS AND ADVANTAGES OF THE INVENTION

Accordingly, it is a primary object of the present invention to provide a micromachined cantilever structure which takes advantage of piezoresistors to measure deflections. The cantilever of the invention is intended but not limited to use in atomic force microscopy (AFM), scanning probe microscopy (SPM), data storage devices, nanotribology systems, actuators, accelerometers and the like. Specifically, it is an object of the invention that the cantilever structure measure lateral deflection and vertical deflection independently to thus ensure a high level of measurement precision for each deflection mode.

It is another object of the invention to provide a cantilever structure in which a beam portion is constructed of high aspect ratio ribs.

Still another object of the invention is to produce the piezoresistors of the invention in a simple manner. In particular, the sides of the ribs and other parts of the cantilever structure can be ion-implanted to produce the piezoresistors and any other electrical components.

Other objects and advantages of the invention will become apparent upon reading the detailed description.

SUMMARY OF THE INVENTION

These objects and advantages are attained by a micromachined cantilever structure supported on a base and having a beam portion with a fixed end, which is attached to the base, and a free end. The beam portion has at least one high aspect ratio rib, and preferably four such ribs. A first lateral-sensing piezoresistor is fabricated on a side of one of the ribs. According to generally known principles, the resistance of this first lateral-sensing piezoresistor will change when the free end is deflected laterally. A first electrical circuit incorporated in the cantilever structure is electrically connected to the first lateral-sensing piezoresistor and senses the resistance changes produced in this resistor by lateral deflection.

Generally, the cantilever structure will also have a probe mounted on the free end. The probe has a deflecting portion with a first vertical-sensing piezoresistor positioned in the probe. The location of the first vertical-sensing piezoresistor is such that its resistance changes when the deflecting portion is deflected vertically. A second electrical circuit in the cantilever structure is provided for sensing the change in resistance of the first vertical-sensing piezoresistor.

In a preferred embodiment of the invention the probe has a triangular structure with a base, a first leg and a second leg. The base is connected to the free end, specifically to the rib or ribs of the beam portion. The deflecting portion includes the first leg and the second leg. Thus, the first vertical-sensing piezoresistor is preferably positioned in one of the legs in a section which experiences mechanical stress when the probe is vertically deflected. To maximize the change in resistance under vertical deflection of the deflecting portion a second vertical-sensing piezoresistor is positioned in the other leg. In this embodiment the second electrical circuit will sense the change in resistance produced in both vertical-sensing piezoresistors. Preferably, the beam portion has two fully conducting ribs joined to the base which conduct current to the vertical deflection sensing piezoresistors in the triangular structure. These two ribs are used as part of the second electrical circuit, which further includes the base and the two legs.

In some probes a sensing tip is mounted on the deflecting portion. Such sensing tip is required for sensing topology, e.g., in atomic force microscopy (AFM) or scanning probe microscopy (SPM). Of course, the cantilever of the invention can also be used in other arrangements such as data storage devices, nanotribology systems, actuators and accelerometers.

Preferably, the piezoresistors are ion-implanted regions. Other means of making the piezoresistors may be employed. The lateral-sensing piezoresistors are ion-implanted regions in the side of one or more ribs making up the beam portion which bends in response to a lateral force. The vertical-sensing piezoresistors are ion-implanted regions on the top (or bottom) of the triangular regions. The electrical circuits can be produced by appropriate ion-implantation as well.

In the preferred embodiment the beam portion has two ribs with lateral-sensing piezoresistors. The change in resistance of both of these resistors is detected by the first electrical circuit. To maximize the signal, both lateral-sensing piezoresistors are positioned in sections of the ribs experiencing high mechanical stress, and the same polarity of stress, when the free end, or the probe, is deflected laterally. Analogously, the vertical-sensing piezoresistors are located where they will experience maximum stress and the same polarity of stress to produce a large signal.

Another embodiment of the present invention measures force in three dimensions by locating piezoresistors on 3 mutually orthogonal sets of high aspect ratio beams. Each set of beams is compliant in only one direction.

A detailed description of the cantilever structure is presented in the description section in reference to the attached drawing figures.

DETAILED DESCRIPTION

Figure 1:
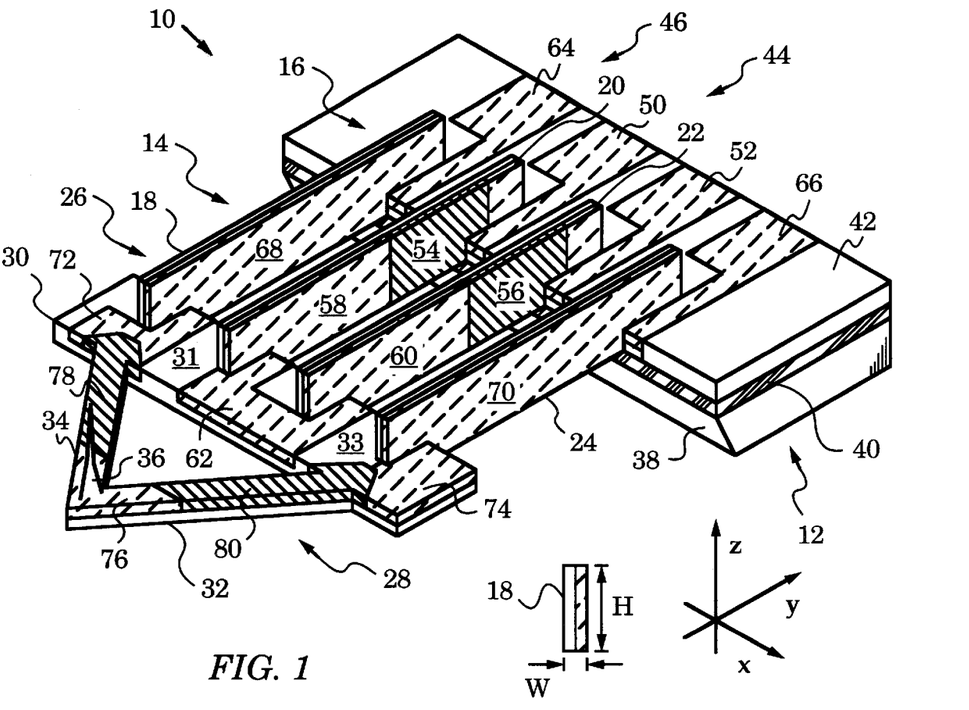
FIG. 1 is an isometric view of a cantilever structure according to the invention.

The preferred embodiment of a micromachined cantilever structure 10 according to the invention is illustrated in FIG. 1. A block or base 12 of structure 10 supports a beam portion 14 by a fixed end 16. Four X-deflecting high aspect ratio ribs 18, 20, 22 and 24 make up beam portion 14. As shown on the example of the cross section of rib 18, the height H of rib 18 is larger than its width W. In other words, the aspect ratio, H/W, of rib 18 is larger than 2:1. Preferably, The ribs 18, 20, 22 and 24 have a width of 1–2 microns and a height of about 10 microns. The length of the ribs 18, 20, 22 and 24 may be about 100 microns.

A probe 28 is mounted on a free end 26 of beam portion 14. In this embodiment probe 28 has a triangular structure with a probe base 30, a first leg 32 and a second leg 34. Base 30 and legs 32, 34 actually form an isosceles triangle. Alternatively, base 30 and legs 32, 34 can be arranged in a rectangle or other shapes. A sensing tip 36 is positioned at the apex of the triangle or at the junction between legs 32 and 34. Ribs 18, 20, 22, 24, probe 28, and tip 36 are adapted in shape, strength and other mechanical characteristics to the specific application for which cantilever structure 10 is intended. For silicon, the probe 28 may have a thickness (vertical dimension) of 1–2 microns, a width in each leg 32, 34 of 10 microns, and an overall length of 100 microns (from a free end 26 to probe 28 tip).

Base 12 is built up of three layers. The bottom layer 38 is made of silicon. An intermediate insulating layer 40 consists of an oxide. A top layer 42 is made of silicon just like bottom layer 38. It will be apparent to one skilled in the art that this layered structure of base 12 is not required. In the preferred embodiment, however, this arrangement of layers 38, 40 and 42 results from a preferred method of making cantilever structure 10 as described below.

Cantilever structure 10 has a first electrical circuit 44 and a second electrical circuit 46. The first electrical circuit extends through the regions numbered 50, 54, 58, 62, 60, 56, and 52. The second electrical circuit extends through regions numbered 64, 68, 72, 78, 34, 80, 74, 70, and 66. For better visualization all electrically conductive parts of cantilever structure 10 are hatched with dashed lines and piezoresistive parts are designated by solid cross-hatching. In fact, hatchings generally correspond to ion-implanted regions of structure 10, as explained below.

The X, Y and Z directions are generally known in the art.

First electrical circuit 44 senses lateral deflections (i.e. deflections in the X-direction) of the probe tip 36. Two contact pads 50 and 52 on the top face of top layer 42 provide for electrical connections. Two lateral-sensing piezoresistors 54 and 56 are positioned or patterned in sides 58 and 60 of ribs 20 and 22. Preferably, piezoresistors 54 and 56 are located at the points where ribs 20, 22 experience the highest mechanical stress when free end 26 is deflected laterally (i.e. in the X-direction). In other words, the position of piezoresistors 54, 56 is selected to produce the maximum signal when ribs 20 and 22 bend along the x axis. One such location is close to base 12. In addition, piezoresistors 54, 56 do not extend along the entire length of sides 58, 60 to avoid signal cancellation due to opposite polarites of piezoresistive response at the two ends of sides 58, 60.

The remaining portions of sides 58 and 60 are highly electrically conductive and have negligible piezoresistive properties. Base 30 of probe 28 includes a conducting portion 62 between sides 58 and 60 of ribs 20 and 22 to complete first electrical circuit 44. Thus, an electrical current can flow from pad 50 via piezoresistor 54 and side 58, through conducting portion 62 through side 60 and piezoresistor 56 to contact pad 52. Under lateral deflection the resistance of first circuit 44 or, specifically, resistance of the piezoresistors 54, 56 will change.

Figure 2:
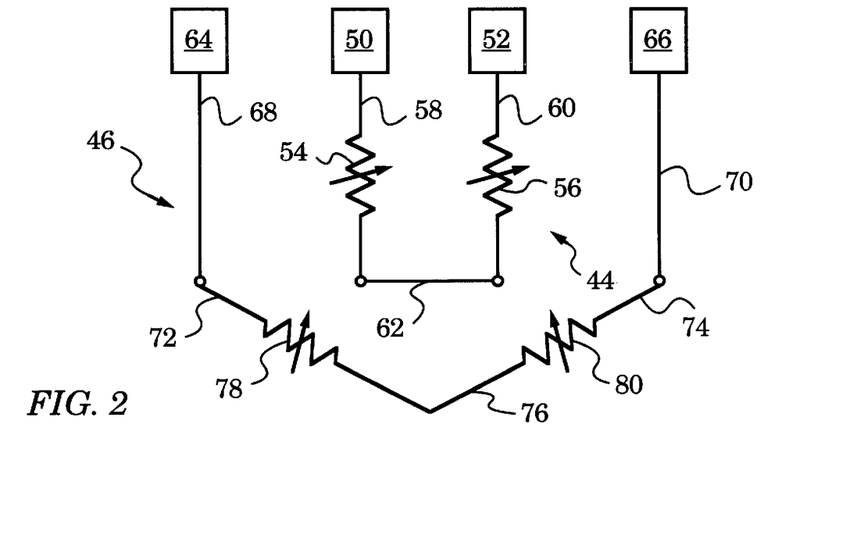
FIG. 2 is a circuit diagram of the two electrical circuits embedded in the cantilever structure of FIG. 1.

The equivalent circuit diagram for first circuit 44 is illustrated in FIG. 2. Piezoresistors 54, 56 are shown as variable resistors. The portions of circuit 44 corresponding to individual parts of cantilever structure 10 are referred to using the same reference numerals.

Figure 3:
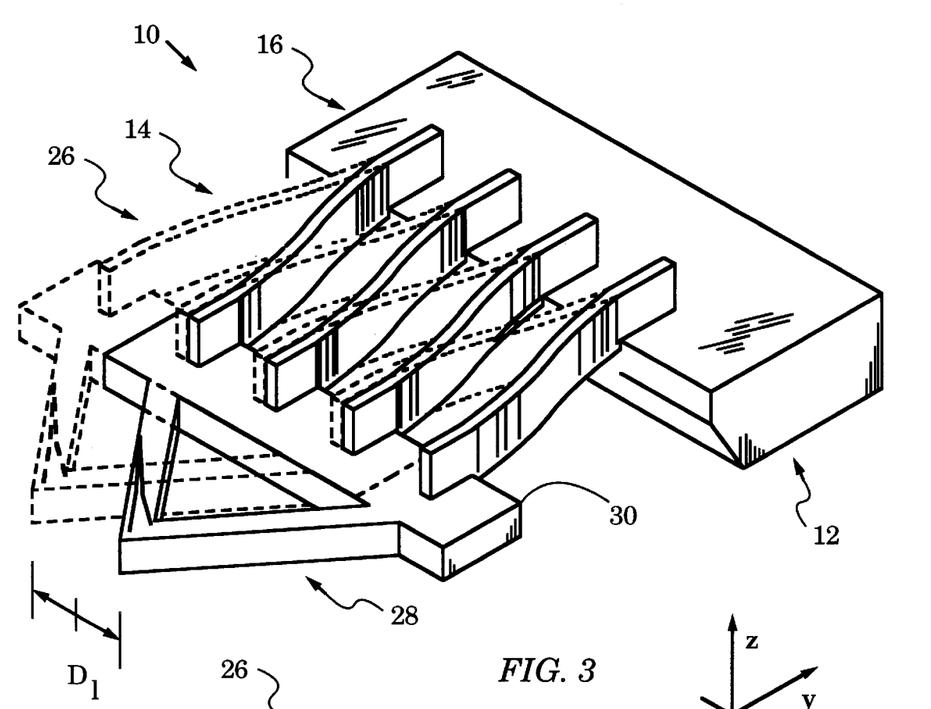
FIG. 3 is an isometric view illustrating lateral deflection of the beam portion of the cantilever of FIG. 1.

A range $D_1$ of lateral deflection of probe 28 along the x axis is illustrated in FIG. 3. At the center (rest position) of range $D_1$ the resistance of piezoresistors 54 and 56 has a certain reference value. This reference value is used in measuring deflections of probe 28 to the left and to the right. The sign of the resistance change of piezoresistors 54 and 56 is positive or negative with respect to this reference value depending on whether probe 28 is displaced to the right or left of the center of range $D_1$.

Referring back to FIG. 1, second electrical circuit 46 has two contact pads 64 and 66. Conductive sides 68 and 70 of ribs 18 and 24, conducting portions 72, 74, 76 and vertical-sensing piezoresistors 78, 80 complete circuit 46. The equivalent circuit diagram for circuit 46 is also shown in FIG. 2. Piezoresistors 78 and 80 are designated by variable resistors. Other portions of circuit 46 corresponding to individual parts of cantilever structure 10 are referred to using the same reference numerals.

It is noted that the two electrical circuits must be electrically isolated from one another. Therefore, the probe base 30, must not be conductive along its entire length. There must be high resistance regions on the probe base 30 that prevent the vertical and lateral deflection signals from mixing. This can be accomplished by including back-to-back P-N junctions (i.e. a pnp or npn structure) in the regions 31, 33 between the ribs 18, 20, 22 and 24 which conduct the vertical and lateral signals. This will effectively isolate the signals.

Figure 4:
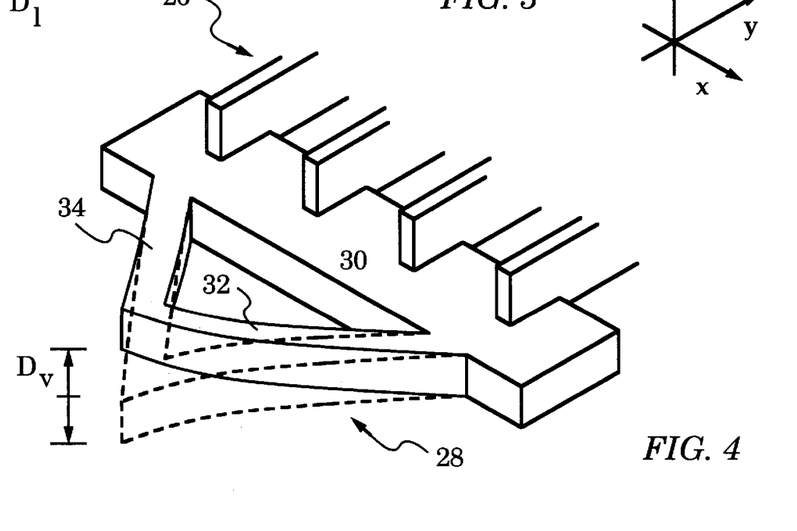
FIG. 4 is an isometric view illustrating the vertical deflection of the probe of the cantilever structure of FIG. 1.

FIG. 4 depicts a range $D_v$ of vertical deflection (i.e. in the Z-direction) of probe 28, and specifically of legs 32 and 34, along the z axis. At the center (rest position) of range $D_v$ the resistance of piezoresistors 78 and 80 achieves a reference value. This reference value is used in measuring upward and downward deflections of probe 28. The sign of the resistance change of piezoresistors 78 and 80 is positive or negative with reference to this calibration value depending on whether probe 28 is displaced down or up from the center of range $D_v$.

Figure 5:
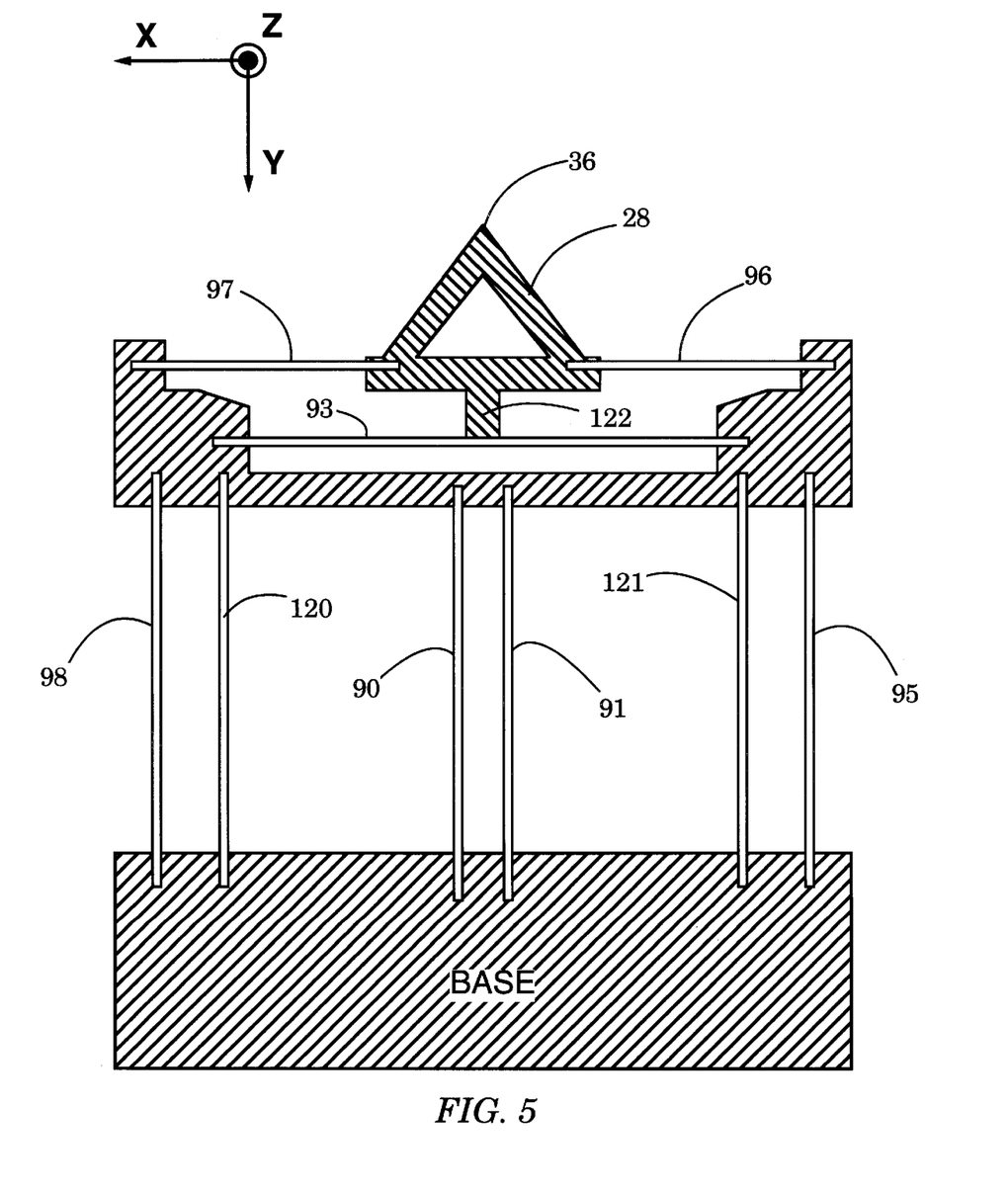
FIG. 5 is a top plan view of an embodiment capable of measuring three dimensional force components.

The present invention is also capable of providing a structure for independently measuring all three dimensional components of a force applied to the tip 36. Such a structure is shown in the top view of FIG. 5. Two high aspect ratio ribs 90, 91 (seen edge-on) provide for lateral force sensing (in the X direction) in the same manner as described above. Vertical force sensing (in the Z direction) is provided by using a triangular probe 28 with piezoresistors in the same manner as described above. Ribs 95, 96, 97, 98 are fully conducting and are used to provide electrical connections to the probe 28 from the base. Forces in the third, longitudinal direction (the Y direction) are sensed using a Y-deflecting high aspect ratio rib 93 extending laterally (in the X direction) and having piezoresistors. Ribs 120, 121 are fully conducting and are used to provide electrical connections to rib 93. The probe 28 must have a member 122 which is mechanically connected to the rib 93. Member 122 transmits longitudinal force to rib 93 from probe 28 when the probe experiences a force in the Y-direction. To summarize, piezoresistors are only located on probe 28, ribs 90, 91, and rib 93 to sense forces acting on the probe tip in the Z, X and Y directions, respectively. All other ribs are fully conducting and serve only to provide electrical connections and mechanical rigidity. Of course, all three electrical circuits in this embodiment must be electrically isolated as in the above described two-dimensional sensing embodiment.

It will be obvious to one skilled in the art that other deflection sensing techniques can be used to independently sense the deflection of the beams. Piezoelectric transducers or well known optical techniques are good examples.

In other embodiments of the present invention, any number of high aspect ratio ribs may be used. Also, the ribs may have orientations different from the above described embodiment. For example, the probe 28 may have ribs oriented for lateral force sensing and the beam closest to the base 12 may have ribs oriented for vertical force sensing.

METHOD OF MAKING THE CANTILEVER STRUCTURE

Figure 6:
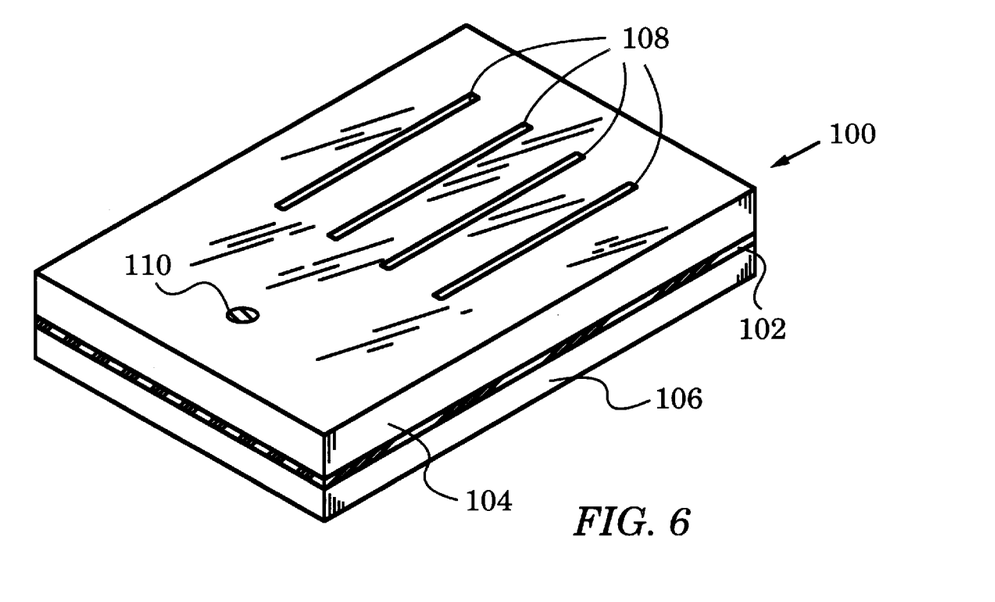
FIG. 6 is an isometric view of a block from which a cantilever structure is produced.

A preferred method of making cantilever structure 10 is shown in FIGS. 6 through 10. The process starts with a block of silicon 100 having a buried oxide layer 102 as illustrated in FIG. 6. Preferably, the block 100 has a (100) crystal orientation, this crystal orientation produces piezoresistors with relatively high sensitivity compared to other crystal orientations. Block 100 has a top layer 104 and a bottom layer 106, i.e., a bulk silicon layer. An oxide pattern 108 corresponding to ribs 18, 20, 22 and 24 is formed on top layer 104. Also, a suitable photoresist 110 for producing tip 36 is formed on top layer 104. The thickness of the top layer 104 is equal to the height of the ribs 18, 20, 22 and 24.

Figure 7:
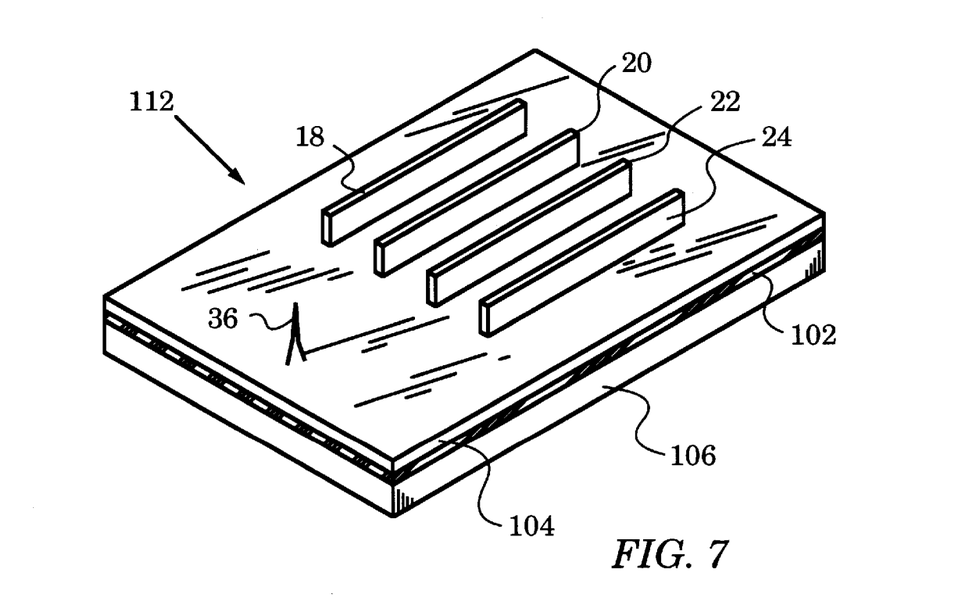
FIG. 7 is an isometric view of the block of FIG. 6 after a first processing step.

A first etching step preferably using a plasma etcher capable of deep silicon etching removes top layer 104 around pattern 108 to expose high aspect ribs 18, 20, 22 and 24. During the same etching step photoresist 110 is worn away from the top and from the sides and therefore gradually decreases in diameter. The silicon under the photoresist 110 is etched to produce a sharp tip 36. The resulting structure 112 is shown in FIG. 7. Note that a small thickness (1–2 microns) of original top layer 104 remains to cover buried oxide layer 102 and provide sufficient material for making probe 28. The thickness of the triangular probe 28 is equal to the thickness of the remaining top layer 104.

Figure 8:
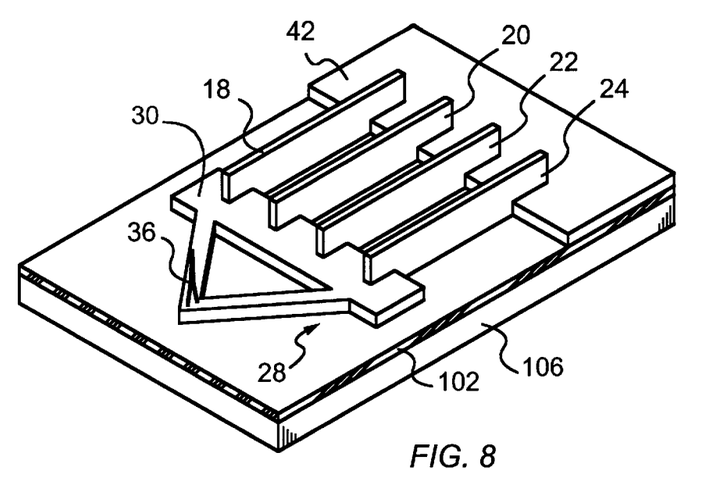
FIG. 8 is an isometric view of the block of FIG. 6 after a second processing step.

During a second etching step the remainder of top layer 104 is etched away to produce probe 28 and top 42 of base 12. Of course, a new lithographic mask is needed for this etching step. Preferably, this etching step is also performed with a plasma etcher. The buried oxide layer 102 is now exposed in predetermined locations. The result of this processing step is illustrated in FIG. 8.

A third step, actually consisting of two separate ion-implantation steps, is used to form electrical circuits 44 and 46. Those surfaces not intended to be doped are masked with photoresist. During the first ion-implanting step illustrated in FIG. 9 the exposed surfaces of ribs 18, 20, 22, 24, probe 28 and top 42 are doped. In the preferred method the doping is achieved by ion-implantation with boron or another suitable element.

Figure 9:
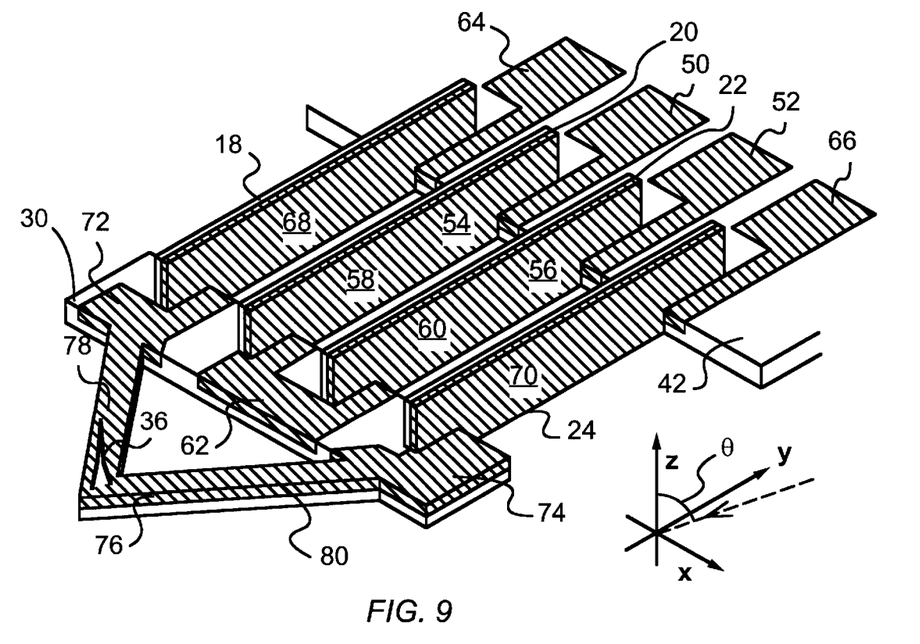
FIG. 9 is an isometric view of the block of FIG. 6 after a first ion-implantation step.

It is well-known that a heavily boron-doped region is highly conductive while a lightly implanted region has a high piezoresistive coefficient in addition to moderate conductivity. Hence, in the first ion-implantation step all portions of first circuit 44 and second circuit 46 are lightly boron-doped. This step produces lightly doped regions, i.e., piezoresistive regions, corresponding to contact pads 50, 52, 64, 66, conductive sides 58, 60, 68, 70 of ribs 18, 20, 22, 24, conducting portions 62, 72, 74, 76 and piezoresistors 54, 56, 78, 80.

The boron implantation is most preferably performed with the ion beam, indicated by the dashed arrow, incident at angle $\theta \approx 45°$ to the vertical (z axis). This allows the entire side surface 68, 58, 60, 70 of each beam to be implanted. Preferably, the path of the incident ion beam lies in or close to the X-Z plane. Clearly, proper spacing between ribs 18, 20, 22 and 24 is essential to prevent the production of shadows. Shadows will produce insulating regions.

Shadows must also be avoided at the locations where the ribs 18, 20, 22 and 24 contact the top 42 of base 12 and where the ribs 18, 20, 22 and 24 contact the probe base 30. In other words, a continuous conductive (i.e., ion-implanted) region must extend from the ribs 18, 20, 22 and 24 to the probe base 30 and base 12.

Figure 10:
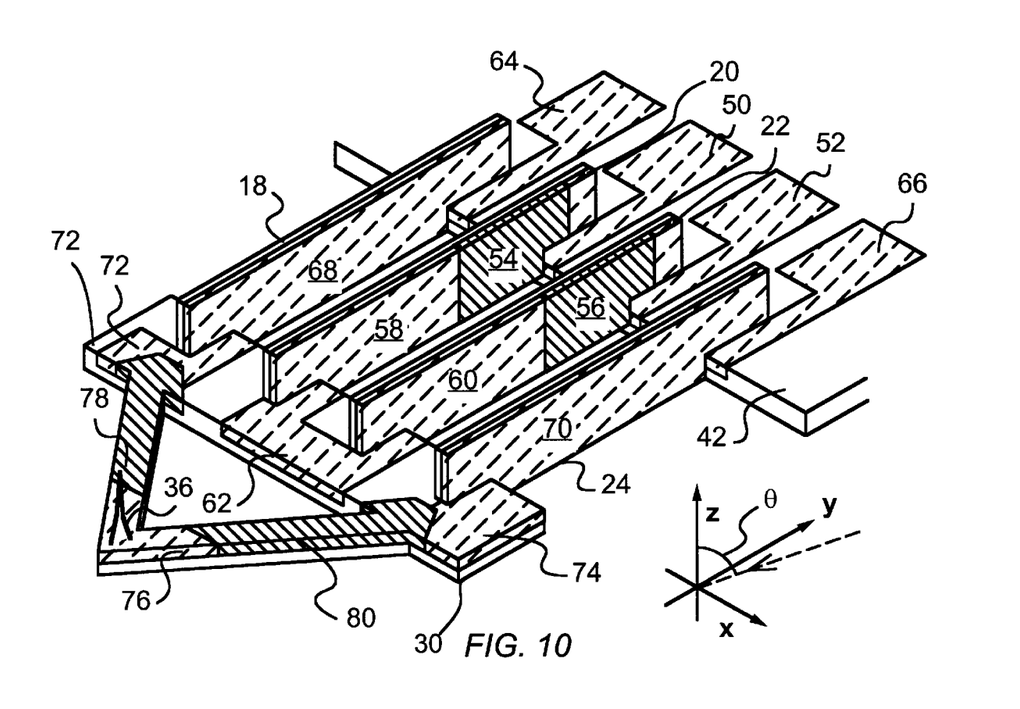
FIG. 10 is an isometric view of the block of FIG. 6 after a second ion-implantation step.

During the second patterning step, shown in FIG. 10, the ion beam is once again incident at $\theta \approx 45°$. An appropriate photoresist mask is used to ensure that regions corresponding to piezoresistors 54, 56, 78 and 80 are not exposed to the ion beam. Meanwhile, the remaining portions of circuits 44 and 46 receive a high dose of boron and become highly conductive.

All the implants are then activated using thermal annealing. Metallic contact pads are then formed on base top surface 16 to allow external electrical connections to be made to regions 50, 52, 64, and 66.

Finally, in a finishing step bottom layer 106 and remaining oxide layer 102 are etched away to release cantilever structure 10 as illustrated in FIG. 1. For example, potassium hydroxide and hydrofluoric acid can be used to etch the silicon bottom layer 106 and oxide layer 102, respectively. The cantilever structure 10 can be protected from etching by exposing only the reverse side of the wafer to the etch.

To prevent the entire bottom layer 106 from being etched away, a suitable mask (silicon nitride) can be used to protect it.

Figure 11:
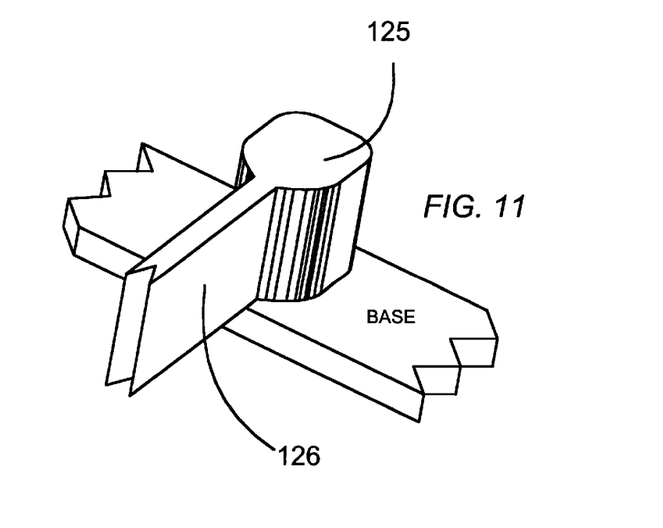
FIG. 11 is a closeup view of where a rib contacts the base.

A closeup of the end of a rib is shown in the perspective view of FIG. 11. It is noted that making the ends 125 of the ribs 18, 20, 22 and 24 wider than the midsection 126 of the ribs is advantageous because it will make the structure 10 stronger by means of a larger contact footprint between the ribs and base 12 and probe base 30.

Cantilever structure 10 according to the invention can be used in many applications. In fact, devices such as atomic force microscopes (AFM), scanning probe microscopes (SPM), nanotribology systems, actuators, force sensors, and accelerometers stand most to gain from employing structure 10. This is because cantilever 10 measures lateral deflection and vertical deflection independently, thus ensuring a high level of precision in analyzing surface topology.

In the case of an accelerometer, for example, the tip 36 would be replaced with a mass. Acceleration will cause the mass to exert a proportional force on the probe tip 36.

Figure 12:
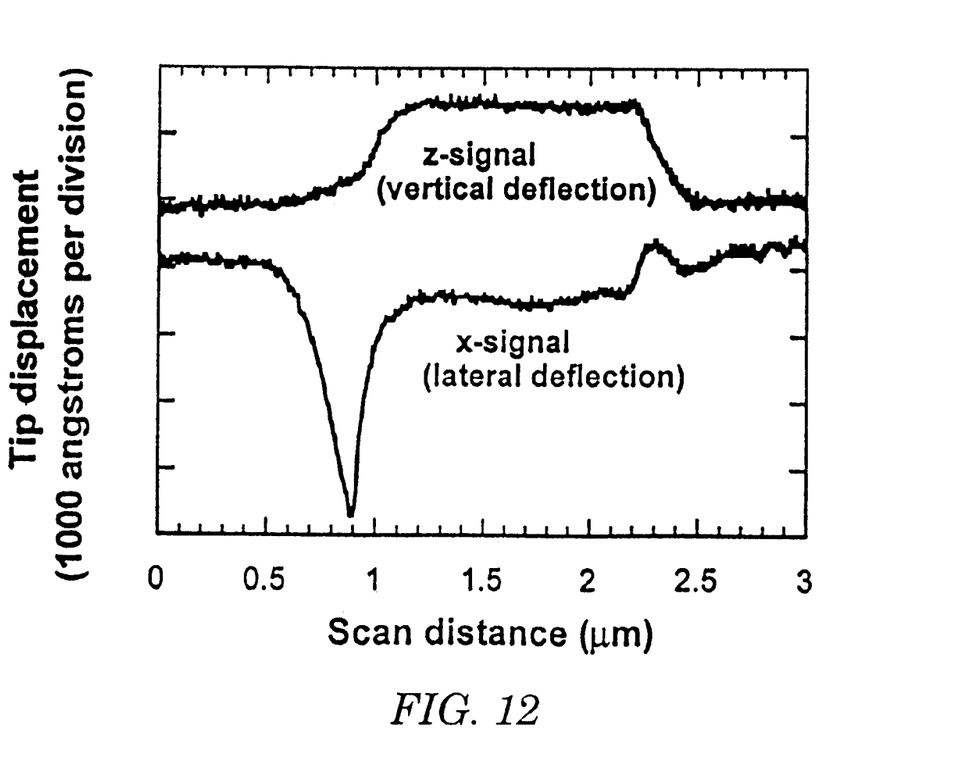
FIG. 12 is a scan graph of a vertical step obtained with the cantilever structure.

The graphs in FIG. 12 illustrates the performance of cantilever structure 10 in scanning across a rising step on a surface (not shown). The lower graph corresponds to lateral deflection measured by resistance change in circuit 44. As expected, probe 28 is first laterally deflected when tip 36 encounters the rising edge. Then the tip 36 climbs on top of the step. The top graph shows the vertical deflection of tip 36 as it moves up.

It will be clear to one skilled in the art that the above embodiment may be altered in many ways without departing from the scope of the invention. Accordingly, the scope of the invention should be determined by the following claims and their legal equivalents.

What is claimed is:

1. A micromachined cantilever structure for deflection sensing comprising:
    a) a base;
    b) a beam portion having a fixed end and a free end, said fixed end being attached to said base, said beam portion comprising at least one X-deflecting high aspect ratio rib extending in a Y-direction and oriented planar parallel to a ZY plane such that the rib may laterally deflect in a X-direction;
    c) a first lateral-sensing piezoresistor positioned in a side of said at least one high aspect ratio rib such that the resistance of said first lateral-sensing piezoresistor changes when said free end is deflected laterally; and
    d) a first electrical circuit in said cantilever structure for sensing the change in resistance of said first lateral-sensing piezoresistor.

2. The cantilever structure of claim 1 further comprising:
    a) a probe having a deflecting portion and being mounted on said free end;
    b) a first vertical-sensing piezoresistor positioned in said probe such that the resistance of said first vertical-sensing piezoresistor changes when said deflecting portion is deflected vertically; and c) a second electrical circuit in said cantilever structure for sensing the change in resistance of said first vertical-sensing piezoresistor.

3. The cantilever structure of claim 2 wherein said probe has a triangular structure comprising a base, a first leg and a second leg, said deflecting portion including said first leg and said second leg, said base being attached to said free end, said first vertical-sensing piezoresistor being positioned in said first leg, and said cantilever structure further comprising a second vertical-sensing piezoresistor positioned in said second leg such that said second electrical circuit senses the change in resistance of said second vertical-sensing piezoresistor.

4. The cantilever structure of claim 3 wherein said beam portion comprises at least two conducting ribs, and said second electrical circuit comprises said base, said at least two conducting ribs, said first leg and said second leg.

5. The cantilever structure of claim 2 wherein said first vertical-sensing piezoresistor is positioned in a section of said deflection probe experiencing mechanical stress when said deflecting portion is deflected vertically.

6. The cantilever structure of claim 2 further comprising a sensing tip mounted on said deflecting portion.

7. The cantilever structure of claim 2 wherein said first vertical-sensing piezoresistor is a lightly doped region of said probe.

8. The cantilever structure of claim 2 wherein said first vertical-sensing piezoresistor is an ion-implanted region of said probe.

9. The cantilever structure of claim 2 wherein said second electrical circuit comprises doped regions in said cantilever structure.

10. The cantilever structure of claim 2 wherein said second electrical circuit comprises ion-implanted regions in said cantilever structure.

11. The cantilever structure of claim 1 wherein said beam portion comprises a first high aspect ratio rib and a second high aspect ratio rib, and said first lateral-sensing piezoresistor is positioned in said first high aspect ratio rib, and said cantilever structure further comprises a second lateral-sensing piezoresistor positioned in said second high aspect ratio rib such that said first electrical circuit senses the change in resistance of said second lateral-sensing piezoresistor.

12. The cantilever structure of claim 11 further comprising a probe mounted on said free end, and wherein said beam portion comprises at least two conducting ribs and said first electrical circuit comprises said base, said at least two conducting ribs and said probe.

13. The cantilever structure of claim 1 wherein said first lateral-sensing piezoresistor is positioned in a section of said at least one high aspect ratio rib experiencing mechanical stress when said free end is deflected laterally.

14. The cantilever structure of claim 1 wherein said first lateral-sensing piezoresistor is a lightly doped region of said at least one rib.

15. The cantilever structure of claim 1 wherein said first lateral-sensing piezoresistor is an ion-implanted region of said at least one rib.

16. The cantilever structure of claim 1 wherein said first electrical circuit comprises doped regions in said cantilever structure.

17. The cantilever structure of claim 1 wherein said first electrical circuit comprises ion-implanted regions in said cantilever structure.

18. A micromachined cantilever structure for three dimensional deflection sensing comprising:

a) a base;

b) at least one X-deflecting high aspect ratio rib having a fixed end and a free end, the fixed end being attached to the base such that the rib extends in a Y-direction from the base, wherein the rib is disposed planar parallel with a ZY plane such that the rib may deflect in a X-direction, and wherein the rib has an aspect ratio of at least 2:1;

c) a probe base attached to the free end of the rib;

d) a Y-deflecting high aspect ratio rib attached to the probe base, wherein the Y-deflecting rib is disposed planar parallel with a XZ plane such that the Y-deflecting rib may deflect in a Y-direction, and wherein the Y-deflecting rib has an aspect ratio of at least 2:1;

d) a high aspect ratio probe attached to the Y-deflecting rib, the probe having a probe tip, wherein the probe is disposed planar parallel with a XY-plane such that the probe may deflect in a Z-direction;

whereby the X-deflecting rib deflects in the X-direction in response to a force applied in the X-direction to the probe tip, the Y-deflecting rib deflects in the Y-direction in response to a force applied in the Y-direction to the probe tip, and the probe deflects in the Z-direction in response to a force applied in the Z-direction to the probe tip.

19. The cantilever structure of claim 2 further comprising at least one Y-deflection high aspect ratio rib disposed planar parallel with a ZX plane such that the rib may deflect in a Y-direction, thereby providing for three dimensional deflection sensing.

20. A micromachined cantilever structure for multidirectional deflection sensing comprising:

a) a base;

b) a first high aspect ratio rib oriented planar parallel to a first plane such that it most easily bends in a first direction;

c) a second high aspect ratio rib oriented planar parallel to a second plane such that it most easily bends in a second direction, and d) a sensing means for independently sensing bending in said first rib and bending in said second rib;

wherein:

1) said first direction and said second direction are perpendicular;

2) one end of said first rib is bonded to said base;

3) one end of said second rib is bonded to said first rib opposite said base such that said second rib has a free end opposite said first rib; and 4) said first plane and said second plane are perpendicular;

whereby said first rib and said second rib may bend in perpendicular directions in response to a force applied to said free end.

21. The micromachined cantilever structure of claim 20 wherein said sensing means is a piezoresistive means for sensing mechanical stress.

22. The micromachined cantilever structure of claim 20 wherein said sensing means is a piezoelectric means for sensing mechanical stress.

23. The micromachined cantilever structure of claim 20 wherein said sensing means is an optical-interference based means for sensing deflection.

24. The micromachined cantilever structure of claim 20 wherein said sensing means is an optical beam deflection based means for sensing deflection.

25. The micromachined cantilever structure of claim 20 further comprising a third rib oriented planar parallel to a third plane such that it most easily bends in a third direction, said third plane being perpendicular to said first plane and said second plane, and wherein said third direction is perpendicular to said first direction and said second direction, thereby providing said cantilever structure with three dimensional force sensing capability.

26. A micromachined cantilever structure for deflection sensing comprising:

a) a base;

b) at least one X-deflecting high aspect ratio rib having a fixed end and a free end, the fixed end being attached to the base such that the rib extends in a Y-direction from the base, wherein the rib is disposed planar parallel with a ZY plane such that the rib may deflect in a X-direction, and wherein the rib has an aspect ratio of at least 2:1;

c) a probe base attached to the free end of the rib;

d) a high aspect ratio probe attached to the probe base, the probe having a probe tip, wherein the probe is disposed planar parallel with a XY-plane such that the probe may deflect in a Z-direction;

whereby the rib deflects in the X-direction in response to a force applied in the X-direction to the probe tip, and the probe deflects in the Z-direction in response to a force applied in the Z-direction to the probe tip.

27. The cantilever of claim 26 comprising four parallel X-deflecting high aspect ratio ribs attached to the base and probe base.

28. The cantilever of claim 27 wherein two of the four ribs each comprise a lateral deflection sensing piezoresistor.

29. The cantilever of claim 26 wherein the probe comprises a vertical deflection sensing piezoresistor.

30. The cantilever of claim 29 comprising four parallel X-deflecting high aspect ratio ribs attached between the base and the probe base, and wherein two of the four ribs are highly conductive and are in electrical communication with the vertical deflection sensing piezoresistor.

31. The cantilever of claim 26 wherein the X-deflecting high aspect ratio rib comprises a lateral deflection sensing piezoresistor.

32. The cantilever of claim 18 comprising six parallel X-deflecting ribs attached to the base and probe base.

33. The cantilever of claim 18 wherein the Y-deflecting rib comprises a first end and a second end, and wherein the Y-deflecting rib is attached to the probe base by the first end and the second end such that a middle portion of the Y-deflecting rib is free to bend in the Y-direction.

34. The cantilever of claim 33 wherein the probe is attached to the middle portion of the Y-deflecting rib.

35. The cantilever of claim 32 wherein two of the six ribs comprise lateral sensing piezoresistors.

* * * * *